United States Patent [19]

Cesena

[11] Patent Number: 5,054,864
[45] Date of Patent: Oct. 8, 1991

[54] TRUNK STORAGE APPARATUS

[76] Inventor: Richard Cesena, 806 S. Liberty, Visalia, Calif. 93277

[21] Appl. No.: 554,545

[22] Filed: Jul. 19, 1990

[51] Int. Cl.⁵ ............................................. A47B 88/00
[52] U.S. Cl. ...................................... 312/328; 312/31
[58] Field of Search ................ 312/327, 328, 31, 31.1, 312/311

[56] References Cited

U.S. PATENT DOCUMENTS

| | | | |
|---|---|---|---|
| 510,678 | 12/1893 | Curtice | 312/328 X |
| 559,709 | 5/1896 | Hoff | 312/328 X |
| 782,963 | 2/1905 | Hird | 312/328 |
| 1,665,028 | 4/1928 | Halvorsen | 312/297 X |
| 2,852,143 | 9/1958 | Taber | 312/328 X |
| 3,338,652 | 8/1967 | Martin | 312/328 X |
| 3,666,169 | 5/1972 | Eaton | 312/297 X |
| 4,488,654 | 12/1984 | Odsgard | 312/39 |

*Primary Examiner*—Joseph Falk
*Attorney, Agent, or Firm*—Leon Gilden

[57] ABSTRACT

An apparatus is set forth including a housing defined by a lower storage housing that includes a left, air-tight sealed cabinet for containing fuel therein. The lower housing further includes a divider wall and a further divider wall to separate the lower housing into a plurality of storage compartments, with spaced spring clip members for storage of signal flares. A rearwardly and longitudinally mounted rod is fixedly secured to a rear wall of the housing, including tether lines to secure the rod and associated housing to securement rings mounted to a support floor of a typical automotive trunk and the like. Additionally, a charcoal filter is mounted to the air-tight cabinet, and wherein additionally a flexible fluid absorbent sheet mounted within an elongate housing to a retraction spool is extensible to overlie the lower housing adjacent the air-tight cabinet, and wherein the cylindrical housing for the sheet includes a series or funnels to receive an oil therethrough to impregnate the sheet to limit corrosion and debris from tools and the like stored within the lower housing adjacent the air-tight cabinet.

6 Claims, 4 Drawing Sheets

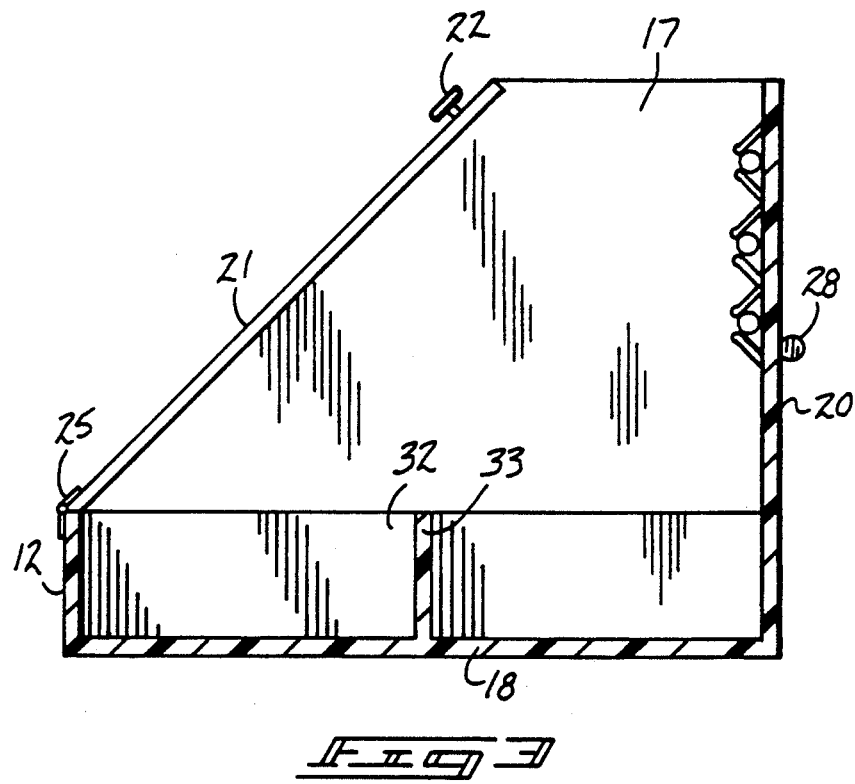
FIG 3
FIG 4
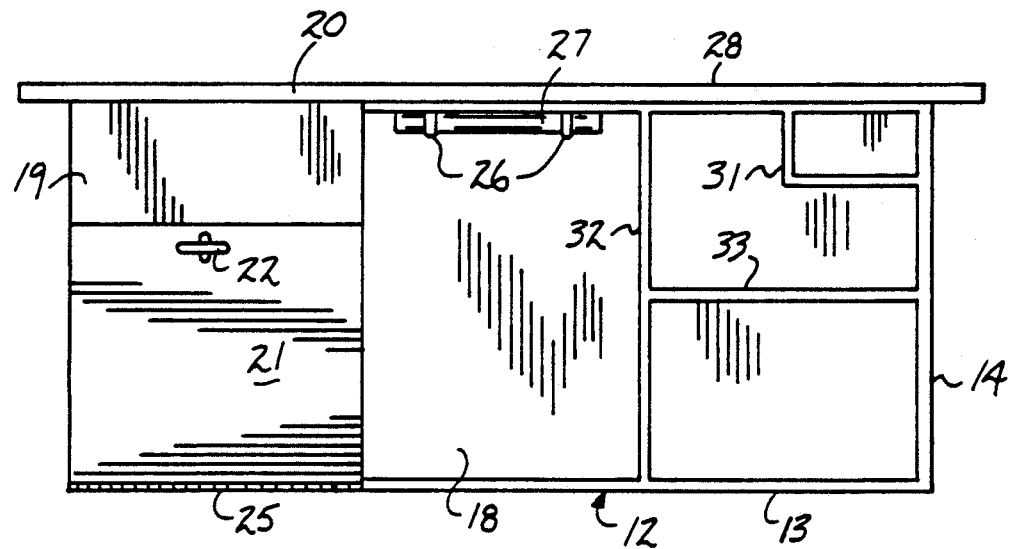

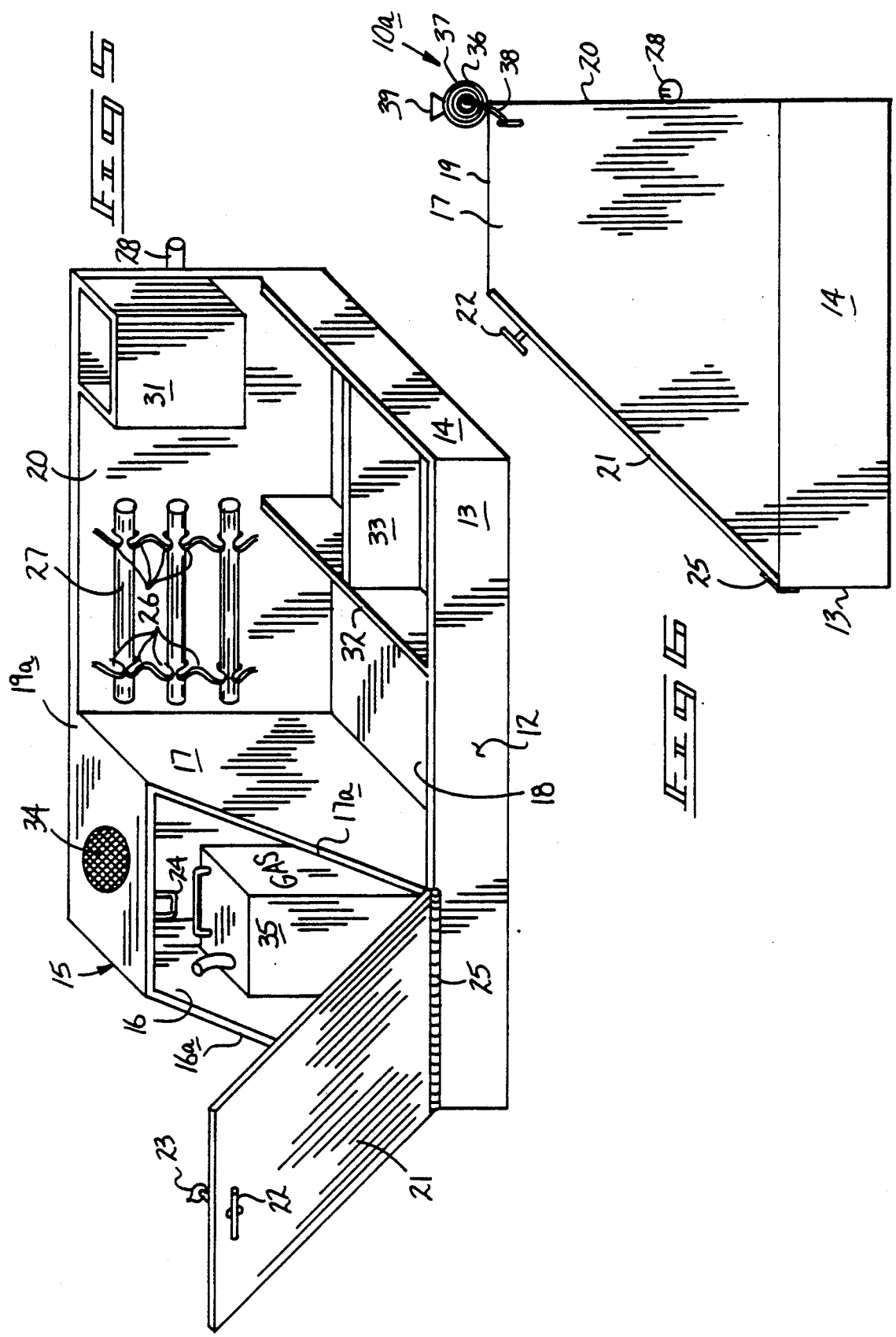

TRUNK STORAGE APPARATUS

BACKGROUND OF THE INVENTION

1. Field of the Invention

The field of invention relates to storage organizing devices and more particularly pertains to a new and improved trunk storage apparatus wherein the same provides for an orderly and secure storage of various articles for storage within a typical automotive trunk compartment.

2. Description of the Prior Art

Organizers of various types have been utilized in the prior art. Storage of articles within an automotive trunk environment is particularly unique due to inherent vibration, debris, and safety required for storage of such articles within an automotive trunk environment. An example of a prior art storage device may be found in Cole U.S. Pat. No. 4,179,158 wherein a compartment is mounted within an engine compartment of an automobile containing a tray and various accessory brackets for securement therein.

Walter U.S. Pat. No. 4,660,880 provides for a storage device for tools and other articles mounted adjacent an interior panel of a forward portion of an automobile, wherein the compartment includes a curvilinear bottom surface to accommodate an inner fender well panel.

Bossone U.S. Pat. No. 2,982,392 provides for a multi-layer storage compartment for containment of various articles of particular use within an automotive environment wherein various recesses are provided for storage of such articles.

Koch U.S. Pat. No. 4,415,483 provides for a storage apparatus for use within a trunk compartment of an automobile. wherein the apparatus is mounted to an interior surface of a trunk lid of the automobile.

Downer U.S. Pat. No. 3,473,680 provides for a tray mounted to an interior portion of a trunk lid of an automobile, wherein the tray is hingedly mounted at its rear wall and secured at its forward wall to the interior surface of the trunk lid to contain various articles therewithin.

As such, it may be appreciated that there is a continuing need for a new and improved trunk storage apparatus which addresses both the problems of ease of use and effectiveness in construction and in this respect, the present invention substantially fulfills this need.

SUMMARY OF THE INVENTION

In view of the foregoing disadvantages inherent in the known types of storage apparatus now present in the prior art, the present invention provides a trunk storage apparatus wherein the same is securable to a support surface within a trunk of an automobile to secure in a safe and convenient manner various articles therewithin. As such, the general purpose of the present invention, which will be described subsequently in greater detail, is to provide a new and improved trunk storage apparatus which has all the advantages of the prior art storage apparatus and none of the disadvantages.

To attain this the present invention comprises an apparatus including a housing defined by a lower storage housing that includes a left, air-tight sealed cabinet for containing fuel therein. The lower housing further includes a divider wall and a further divider wall to separate the lower housing into a plurally of storage compartments, with spaced spring clip members for storage of signal flares. A rearwardly and longitudinally mounted rod is fixedly secured to a rear wall of the housing, including tether lines to secure the rod and associated housing to securement rings mounted to a support floor of a typical automotive trunk and the like. Additionally, a charcoal filter is mounted to the air-tight cabinet, and wherein additionally a flexible fluid absorbent sheet mounted within an elongate housing to a retraction spool is extensible to overlie the lower housing adjacent the air-tight cabinet, and wherein the cylindrical housing for the sheet includes a series of funnels to receive an oil therethrough to impregnate the sheet to limit corrosion and debris from tools and the like stored within the lower housing adjacent the air-tight cabinet.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trunk storage apparatus which has all the advantages of the prior art storage apparatus and none of the disadvantages.

It is another object of the present invention to provide a new and improved trunk storage apparatus which may be easily and efficiently manufactured and marketed.

It is a further object of the present invention to provide a new and improved trunk storage apparatus which is of a durable and reliable construction.

An even further object of the present invention is to provide a new and improved trunk storage apparatus which is susceptible of a low cost of manufacture with regard to both materials and labor, and which accordingly is then susceptible of low prices of sale to the consuming public, thereby making such trunk storage apparatus economically available to the buying public.

Still yet another object of the present invention is to provide a new and improved trunk storage apparatus which provides in the apparatuses and methods of the prior art some of the advantages thereof, while simultaneously overcoming some of the disadvantages normally associated therewith.

Still another object of the present invention is to provide a new and improved trunk storage apparatus wherein the same securely and conveniently is mounted within a trunk compartment of an automobile to confine in a safe and convenient manner various articles therewithin.

These together with other objects of the invention, along with the various features of novelty which characterize the invention, are pointed out with particularity in the claims annexed to and forming a part of this disclosure. For a better understanding of the invention its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken along the lines 3—3 of FIG. 2 in the direction indicated by the arrows.

FIG. 4 is an orthographic top view of the instant invention.

FIG. 5 is an isometric illustration of the instant invention including a charcoal filtration unit associated with a storage cabinet.

FIG. 6 is an orthographic side view taken in elevation of a modified storage apparatus of the instant invention.

DESCRIPTION OF THE PREFERRED EMBODIMENT

Figure 1:
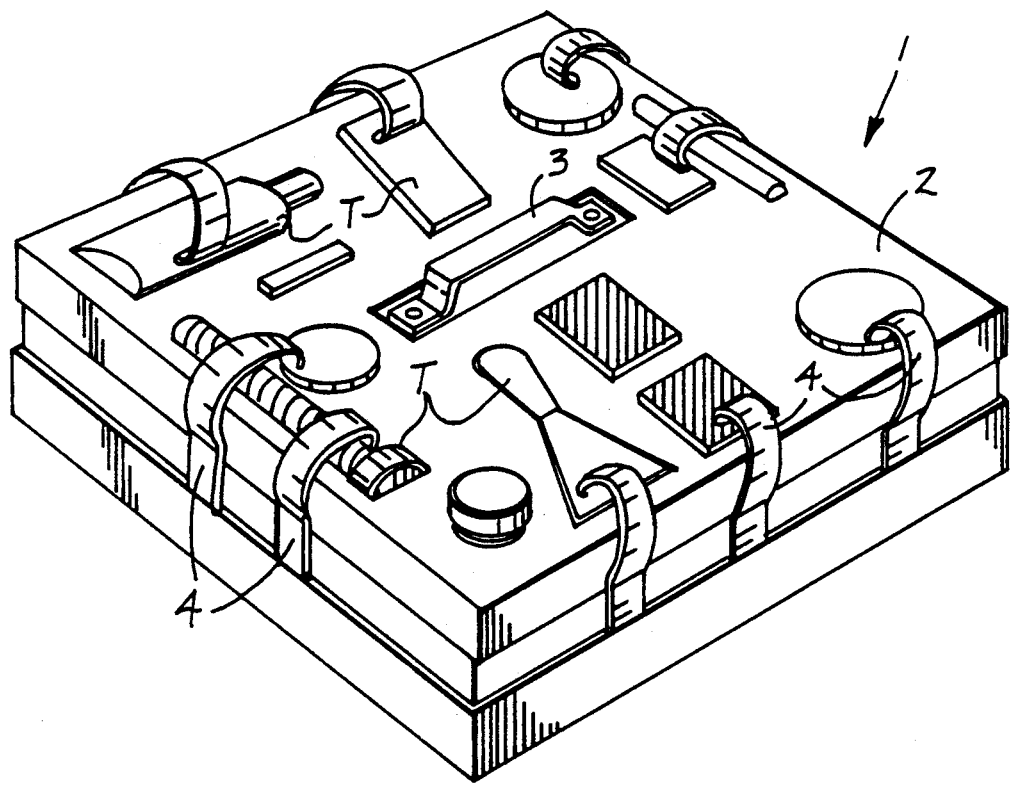
FIG. 1 is an isometric illustration of a prior art storage device.

With reference now to the drawings, and in particular to FIGS. 1 to 8 thereof, a new and improved trunk storage apparatus embodying the principles and concepts of the present invention and generally designated by the reference numerals 10 and 10a will be described.

FIG. 1 is illustrative of a typical prior art storage apparatus 1 comprising a storage container 2 provided with a series of recesses for securement of a variety of tools and items "T" therewithin secured in a restricted manner by use of overlying clamps 4. A handle 3 is positioned medially of an upper surface of the storage unit for transport thereof.

Figure 2:
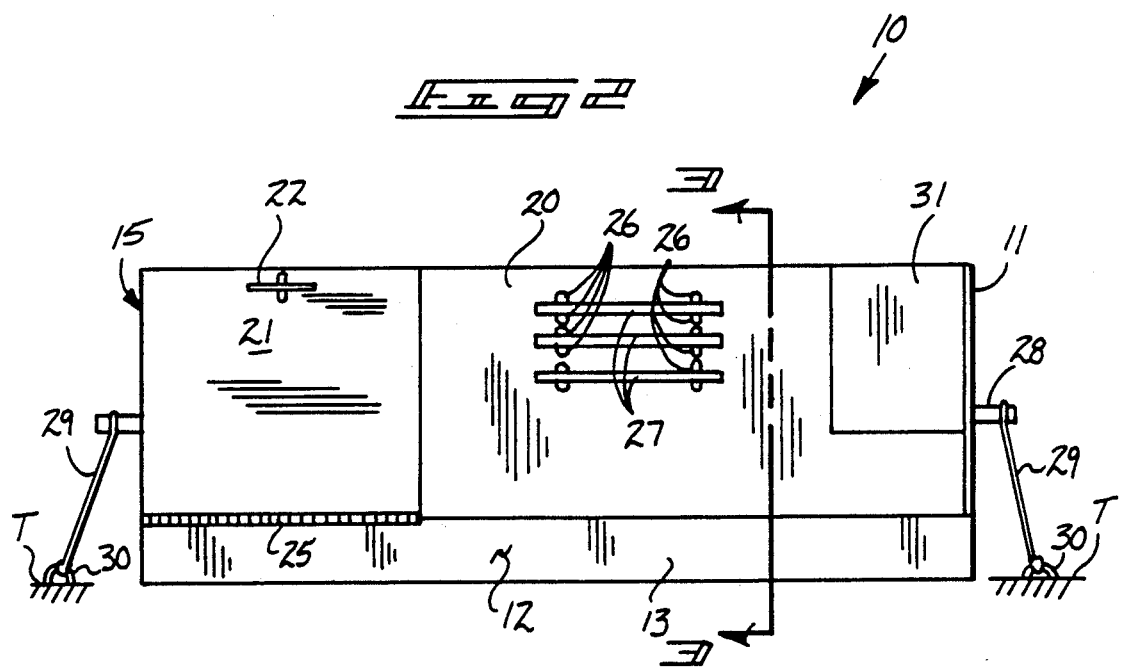
FIG. 2 is front orthographic view, taken in elevation, of the instant invention.

More specifically, the trunk storage apparatus 10 of the instant invention, as typified in FIG. 2, essentially illustrates the use of a main housing 11 defining a lower storage housing 12 integrally formed thereto. A forward wall 13 and a right side wall 14 define the vertical extent of the lower storage housing extending substantially a distance less than that defined by a rectangular elongate rear wall 20. A left cabinet 15 defined between the rear wall 20 and the forward wall 13 includes a pentagonally configured left side wall 16 spaced from a like configured right cabinet wall 17, wherein the respective left and right cabinet walls 16 and 17 define respective forward left and right forwardly sloping edges 16a and 17a respectively that extend from a height substantially aligned with a top edge of the rear wall 20 downwardly towards the forward wall 12. The cabinet structure and storage units are bounded by a floor 18 coextensively formed and orthogonally mounted relative to the rear wall 20 and forward wall 12 extending between the left cabinet wall 16 and the right side wall 14. A top cabinet wall 19 extends orthogonally relative to the rear wall 20 and parallel to the floor 18 and extends forwardly towards the forward wall 12 a distance substantially less than a predetermined width defined by the floor 18. Accordingly, a forward lid 21 is hingedly mounted by use of an elongate hinge 25 mounted to a lower edge of the forward lid 21 to a top edge of the forward wall 12, wherein the forward lid 21 overlies an opening defined and bounded by the respective left and right forwardly sloping edges 16a and 17a, the forward edge defined between the left and right cabinet walls 16 and 17, and a forward edge defined by the top cabinet wall 19. The lid 21 overlies this aforenoted defined opening in a vapor-tight sealing manner to define a vapor secure storage unit, or compartment, therewithin. A twist handle 22 mounts a latch member 23 at a forward end thereof to engage a downwardly extending flange 24 that extends downwardly from interior surface of the top cabinet wall 19 to selectively latch the lid 21 to the aforenoted defined left cabinet 15.

Mounted to an interior surface of the rear wall 20 are plural pairs of spaced spring clips 26 to mount and secure flare cylinders 27 therewithin in a stacked overlying relationship to the rear wall 20 adjacent a top edge of the rear wall 20. An elongate securement rod 28 is fixedly mounted longitudinally relative to a rear surface of the rear wall 20, wherein a plurality of tether lines 29 are mounted at each end of the securement rod 28 as it extends beyond the rear surface of the rear wall 20, with securement rings 80 mounted to a trunk surface "T" to fixedly position the apparatus 10 in a secure manner relative to the aforenoted trunk surface. A storage compartment 31 for securement of automotive "jumper cables" and the like is mounted and integrally formed to an upper right interior surface of the rear wall 20 overlying a plurality of compartments defined by a first divider wall 32 extending orthogonally and fixedly mounted to the rear wall 20 and the forward wall 18, with a second divider wall 88 extending orthogonally relative to the first divider wall 82 and an interior surface of the right wall 14.

Reference to FIG. 5 notes the use of a modified top cabinet wall 19 including a charcoal filter 34 mounted therethrough, wherein vapors from an associated fuel storage container 35 contained therewithin are thereby filtered enabling venting of the interior chamber of the cabinet 15.

Figure 7:
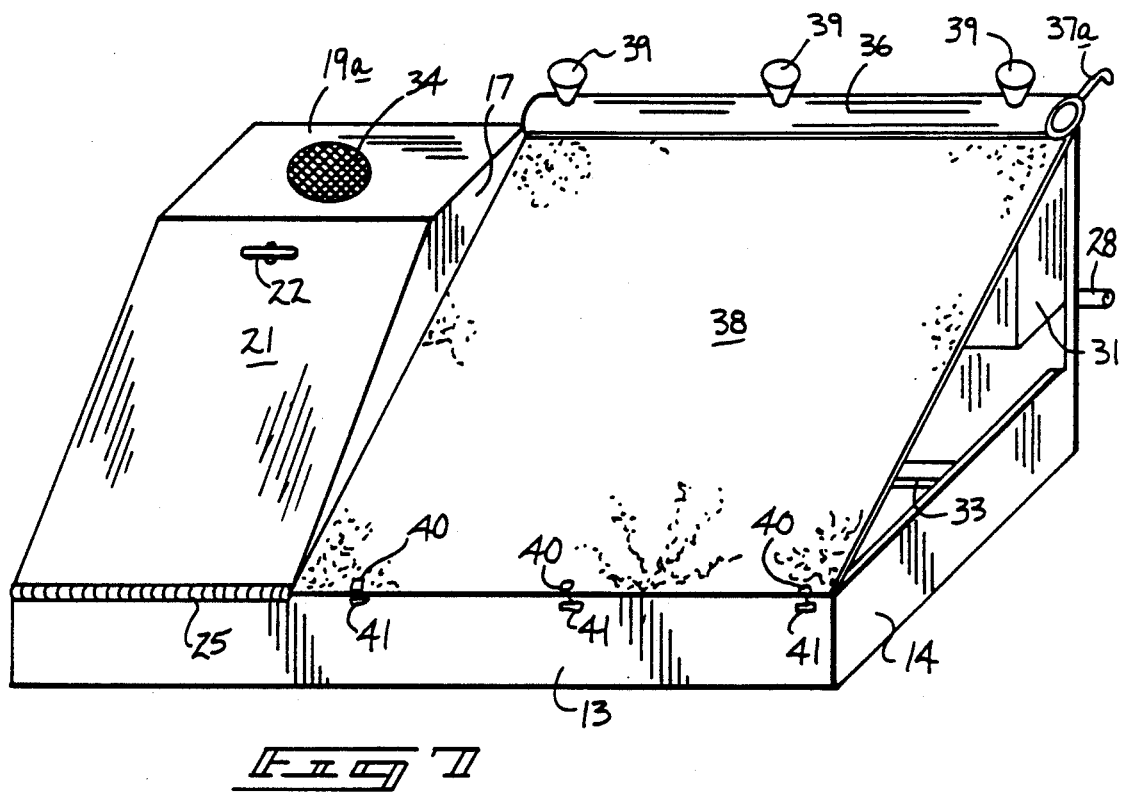
FIG. 7 is an isometric illustration of the modified storage apparatus of the instant invention.
Figure 8:
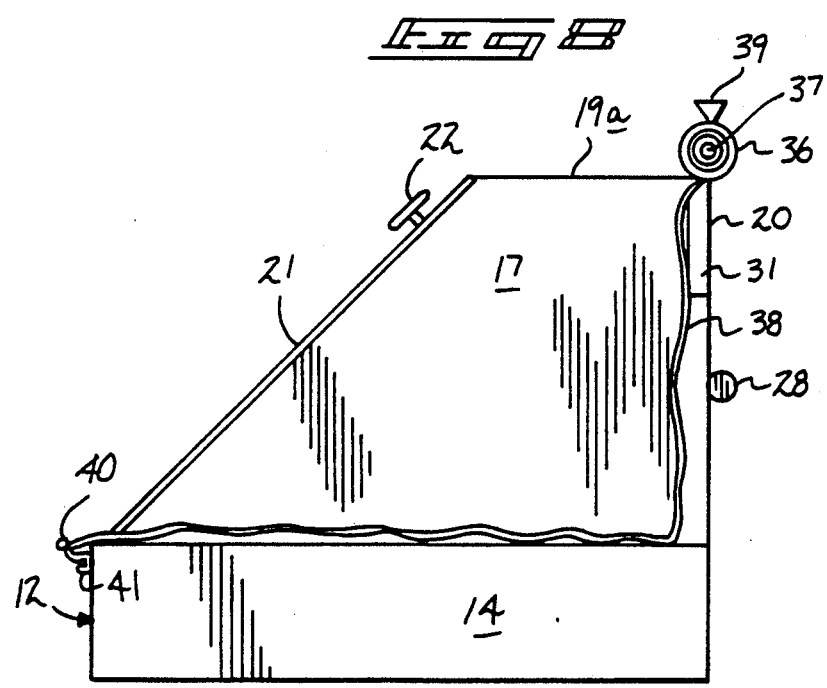
FIG. 8 is an orthographic side view taken in elevation of the covering sheet of the instant invention in an extended configuration overlying a lower storage housing.

Reference to FIGS. 6, 7, and 8 note the use of an elongate cylindrical housing 36 coextensively formed and mounted to the top edge of the rear wall 20 between the right cabinet wall 17 and the right terminal end of the rear wall 20, wherein the cylindrical housing 36 mounts a retraction spool 37 formed with a retraction handle 37a at its outer end to rotatably mount a flexible sheet covering 38 thereabout. The sheet covering 38 is formed of an absorbent fabric wherein a series of aligned conical oiling funnels 39 are mounted in a through-extending manner diametrically aligned with the housing 36 wherein oil directed through the funnels 39 permit soaking of the sheet covering 38, wherein an extension of the sheet covering 38 overlying the lower storage housing 12 adjacent the left cabinet 15 prevents debris from falling upon contents contained within the lower storage housing 12, as well as minimizing corrosion of various metallic tools and the like for storage therewithin. As illustrated in FIGS. 7 and 8, clips 40 are mounted to a forward free end of the sheet 8 and are securable to clasp 41 mounted to an upper edge of the forward wall 13 to secure the sheet 38 in an extended manner wherein, as illustrated in FIG. 8, the sheet may be extended to be positioned overlying the lower storage housing 12 to afford a greater degree of protection thereto.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A trunk storage apparatus for securement to a support surface of an automobile trunk for storage of articles therewithin, comprising in combination, a housing including a rear planar wall, a planar forward panel orthogonally fixed to a lower edge of the rear wall and extending forwardly thereof, and a right side wall fixed to the rear wall and floor orthogonally thereto and extending a vertical height less than that defined by a rear height defined by the rear wall, and a forward wall orthogonally and coextensively fixed to a forward edge of the floor and a forward edge of the right side wall, and a left cabinet positioned between the forward wall and rear wall and fixedly mounted thereto and including a left cabinet wall fixedly mounted between a left edge of the rear wall and a left edge of the forward wall and a left edge of the floor, and a spaced parallel right cabinet wall spaced from the left cabinet wall orthogonally mounted between the forward wall and rear wall, and a lower storage housing defined between the left cabinet wall and the right side wall, and wherein the left cabinet wall and the right cabinet wall are of a generally equal pentagonal configuration and are formed with a respective left forward edge and a right forward edge oriented at an acute angle relative to the floor, and a top cabinet wall fixedly mounted between a top edge of the rear wall and the left forward edge and the right forward edge, and further including a lid overlying the left forward edge and right forward edge hingedly mounted at a lower edge of the lid to an upper edge of the forward wall, and wherein the lid further includes a lock means including a handle mounted to the lid for securing the lid to the top cabinet wall, the top cabinet wall including a flange extending downwardly therefrom cooperative with a latch member mounted to the handle to selectively secure the latch member to the flange, and wherein the top cabinet wall further includes a charcoal filtration unit mounted therethrough, wherein the lid is sealingly secured relative to the left cabinet wall and right cabinet wall, and wherein the cabinet further includes a fuel storage container mounted therewithin, wherein the charcoal filtration unit permits filtration of vapors from the fuel storage container.

2. An apparatus as set forth in claim 1 further including plural pairs of spring clip members mounted to a forward surface of the rear wall, and further including a signal flare securable to each pair of said spring slip members.

3. An apparatus as set forth in claim 2 further including a first divider wall orthogonally mounted between the forward wall and the rear wall defining a height substantially equal to the forward wall and including a second divider wall orthogonally mounted between the first divider wall and an interior surface of the right side wall defining a second divider height equal to that defined by the forward wall, and a further storage compartment mounted to the rear wall positioned adjacent the top edge of the rear wall.

4. An apparatus as set forth in claim 3 including a cylindrical housing coextensively mounted to the top edge of the rear wall between the left cabinet wall and the right edge of the rear wall, the cylindrical housing including a spindle rotatably mounted therewithin and a retraction handle mounted to a free end of the spindle, and a flexible absorbent sheet rotatably mounted within the housing about the spindle, the flexible sheet positionable from a first position interiorly of the cylindrical housing to a second position overlying the lower storage housing.

5. An apparatus as set forth in claim 4 wherein a forward edge of the sheet includes a plurality of clips securable to a plurality of respective latches, the latches mounted to an exterior surface of the forward wall to secure the sheet to the forward wall.

6. An apparatus as set forth in claim 5 wherein the cylindrical housing further includes a plurality of funnels diametrically aligned with the cylindrical housing directed interiorly thereof to enable a corrosion resistant fluid to be directed onto the flexible sheet.

* * * * *